United States Patent [19]
Dohnal et al.

[11] Patent Number: 5,165,295
[45] Date of Patent: Nov. 24, 1992

[54] END STOP FOR STEPPER FOR STEP-TYPE TRANSFORMER

[75] Inventors: Dieter Dohnal, Lappersdorf; Günter Kloth, Saal, both of Fed. Rep. of Germany

[73] Assignee: Maschinenfabrik Reinhausen GmbH, Regensburg, Fed. Rep. of Germany

[21] Appl. No.: 674,758

[22] Filed: Mar. 22, 1991

[30] Foreign Application Priority Data

Mar. 24, 1990 [DE] Fed. Rep. of Germany ....... 4009503

[51] Int. Cl.$^5$ .............................................. F16H 55/17
[52] U.S. Cl. ........................................ 74/436; 74/820; 74/1.5; 200/11 TC
[58] Field of Search .................. 74/436, 820, 526, 1.5; 200/11 TC, 11 TW; 336/148

[56] References Cited

U.S. PATENT DOCUMENTS

| | | | |
|---|---|---|---|
| 2,307,112 | 1/1943 | Cunningham | 74/436 |
| 2,534,724 | 12/1950 | Miller | 74/436 |
| 2,891,405 | 6/1959 | Elmore | 74/1.5 |
| 3,485,965 | 12/1969 | Bleibtreu et al. | 74/436 |
| 3,704,582 | 12/1972 | Wuthrich | 74/1.5 |
| 5,056,377 | 10/1991 | Yatchum et al. | 74/436 |

FOREIGN PATENT DOCUMENTS

| | | |
|---|---|---|
| 0658038 | 2/1963 | Canada ........................... 200/11 TC |
| 1039129 | 12/1963 | Fed. Rep. of Germany . |
| 1220033 | 1/1967 | Fed. Rep. of Germany . |
| 2339973 | 2/1974 | Fed. Rep. of Germany . |
| 2608051 | 9/1977 | Fed. Rep. of Germany . |
| 3017790 | 2/1984 | Fed. Rep. of Germany . |
| 0775769 | 11/1980 | U.S.S.R. ........................ 200/11 TW |

Primary Examiner—Leslie A. Braun
Assistant Examiner—Winnie Yip
Attorney, Agent, or Firm—Herbert Dubno; Andrew M. Wilford

[57] ABSTRACT

A stepper drive for a step-type transformer has an upper geneva wheel rotatable about a wheel axis, a lower geneva wheel spaced below the upper wheel and also rotatable about the axis, and a driver rotatable about a driver axis adjacent the wheels and having an upper abutment engageable with the upper wheel and a lower abutment engageable with the lower wheel and offset by about 180° relative to the driver axis from the upper abutment. A selector abutment is provided on the upper wheel offset from the axis thereof. A selector lever pivotal about a selector axis offset from the wheel axis is engageble with the selector abutment in end positions of the upper wheel. A blocking plate shiftable radially on the lever between an actuated position and an unactuated position is urged by a spring into the unactuated position. A blocking element on the plate is positioned in the path of the upper abutment of the driver in the actuated position and out of the path of the upper abutment of the driver in the unactuated position. The driver is rotated about its axis to displace the upper drive wheel between its end positions, and engage the selector abutment in the one end position of the upper wheel against the blocking element to shift it into the actuated position on such engagement.

5 Claims, 4 Drawing Sheets

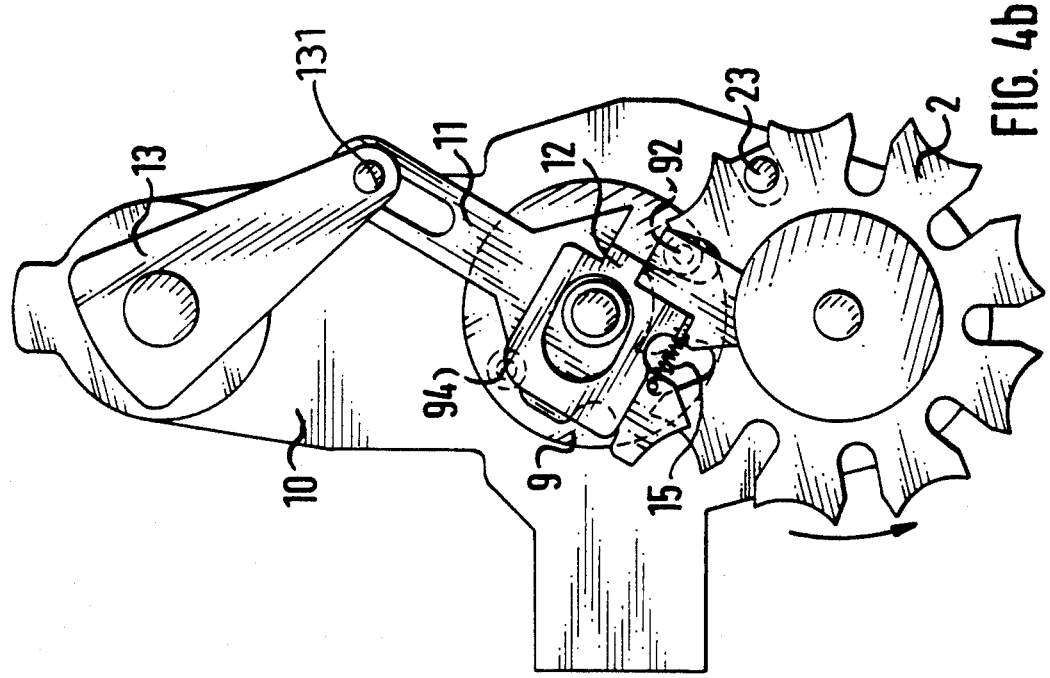
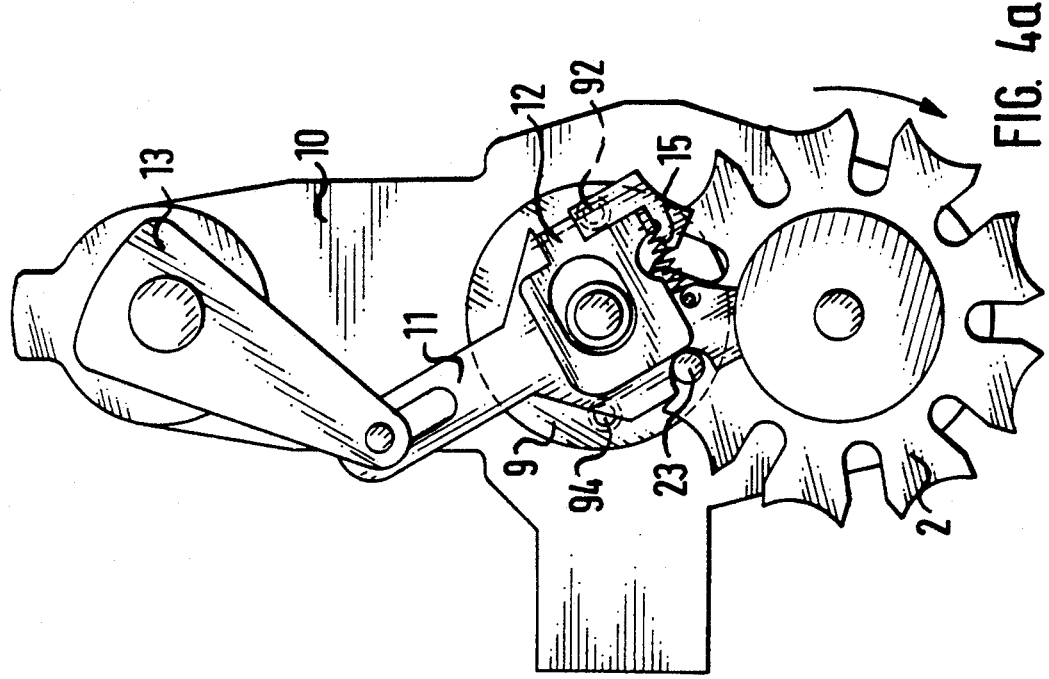

END STOP FOR STEPPER FOR STEP-TYPE TRANSFORMER

FIELD OF THE INVENTION

The present invention relates to a drive for the step selector of a step-type transformer. More particularly this invention concerns a system for defining end positions for the stepper of such a transformer.

BACKGROUND OF THE INVENTION

A standard stepping transformer has a pair of contact arms that are sequentially stepped angularly along circular arrays of contacts. The arms are moved one after the other for proper make/break sequencing. This is done as described, for instance, in German patent 1,220,033 of E. Baumgartner by a dual geneva escapement. One of the arms is carried on one end of a core shaft whose other end carries an upper geneva wheel and the other arm is carried on a tube shaft surrounding this core shaft and carrying on its other end a lower geneva wheel spaced beneath the upper wheel, although of course inverted or side-by-side orientation is also possible. Between these wheels is a driver disk having on its upper face an upper abutment engageable in the radially outwardly open slots of the upper wheel and on its lower face a lower abutment engageable in the similar slots of the lower wheel. The two abutments are spaced apart by 1808° and the driver disk is moved periodically through this angle to step the contact arms angularly, one being moved with each half rotation of the driver disk.

It is extremely important to impede the contact arms from moving full circle. Thus their angular movement must be within less than 360°. Overtravel would without fail result in damage to the switching arrangement.

Accordingly, German patent 1,039,129 of E. Bottger proposes a mechanical end-position latch that which has a separate blocking disk that is coaxial with the selector and that coacts with a pawl that can also be actuated by the selector. Such a separate mechanism is complex and expensive, and is not easy to adapt to blocking movement of two independently movable coaxial wheels.

German patent document 2,608,051 describes a system wherein the actuation of a coarse selector is effected by the geneva wheel which drives the fine selector.

In German 2,339,973 the geneva wheel carries an abutment which at an appropriate time engages a switchover or selector element. In this arrangement it is advantageous that these parts that are used to actuate the reverser or preselector employ elements such as levers, geneva segments and the like as described in German 3,017,790. Although this arrangement is relatively simple it does not impede all types of overtravel of the parts. In particular it does not positively block overtravel of both geneva wheels.

In fact none of the above-discussed systems allows two concentric geneva or maltese-cross wheels to be solidly locked against further movement in two end positions. It is possible to block the upper wheel, but if something goes wrong it is still possible for the driver to continue rotating and for the lower wheel to overtravel, potentially burning out the stepping transformer. Only by expensive and complex duplication of the upper-wheel blocking system is it possible to have a failsafe system, and such extra structure adds excessively to the cost of the arrangement.

OBJECTS OF THE INVENTION

It is therefore an object of the present invention to provide an improved stepper drive for a step-type transformer.

Another object is the provision of such an improved stepper drive for a step-type transformer which overcomes the above-given disadvantages, that is which is relatively simple and that accurately freezes the entire stepper mechanism in both end positions of the device.

SUMMARY OF THE INVENTION

A stepper drive for a step-type transformer according to the invention has an upper geneva wheel rotatable about a wheel axis, a lower geneva wheel spaced below the upper wheel and also rotatable about the axis, and a driver rotatable about a driver axis adjacent the wheels and having an upper abutment engageable with the upper wheel and a lower abutment engageable with the lower wheel and offset by about 180° relative to the driver axis from the upper abutment. A selector abutment is provided on the upper wheel offset from the axis thereof. A selector lever pivotal about a selector axis offset from the wheel axis is engageable with the selector abutment in end positions of the upper wheel. A blocking plate shiftable radially on the lever between an actuated position and an unactuated position is urged by a spring into the unactuated position. A blocking element on the plate is positioned in the path of the upper abutment of the driver in the actuated position and out of the path of the upper abutment of the driver in the unactuated position. The driver is rotated about its axis to displace the upper drive wheel between its end positions, and engage the selector abutment in the one end position of the upper wheel against the blocking element to shift it into the actuated position on such engagement.

Thus when the blocking plate is moved over it positively and totally blocks further movement of the driver, thereby also of course making further rotation of the lower geneva wheel impossible. As a result a situation where the upper geneva wheel is properly blocked in an end position but for some reason the driver and/or the lower wheel is moved becomes impossible.

According to the invention the blocking element is a bent-over tab formed on the blocking plate. The selector lever is formed with a radial guide notch in which the tab engages and slides radially. This tab is bent perpendicular to the plate. In addition according to the invention the selector abutment is a bolt on the upper wheel and the selector lever is formed with a notch in which this bolt is engageable.

BRIEF DESCRIPTION OF THE DRAWING

The above and other objects, features, and advantages will become more readily apparent from the following, reference being made to the accompanying drawing in which:

FIGS. 4a and 4b are end views showing the stepper in its two opposite end positions.

SPECIFIC DESCRIPTION

Figure 1:
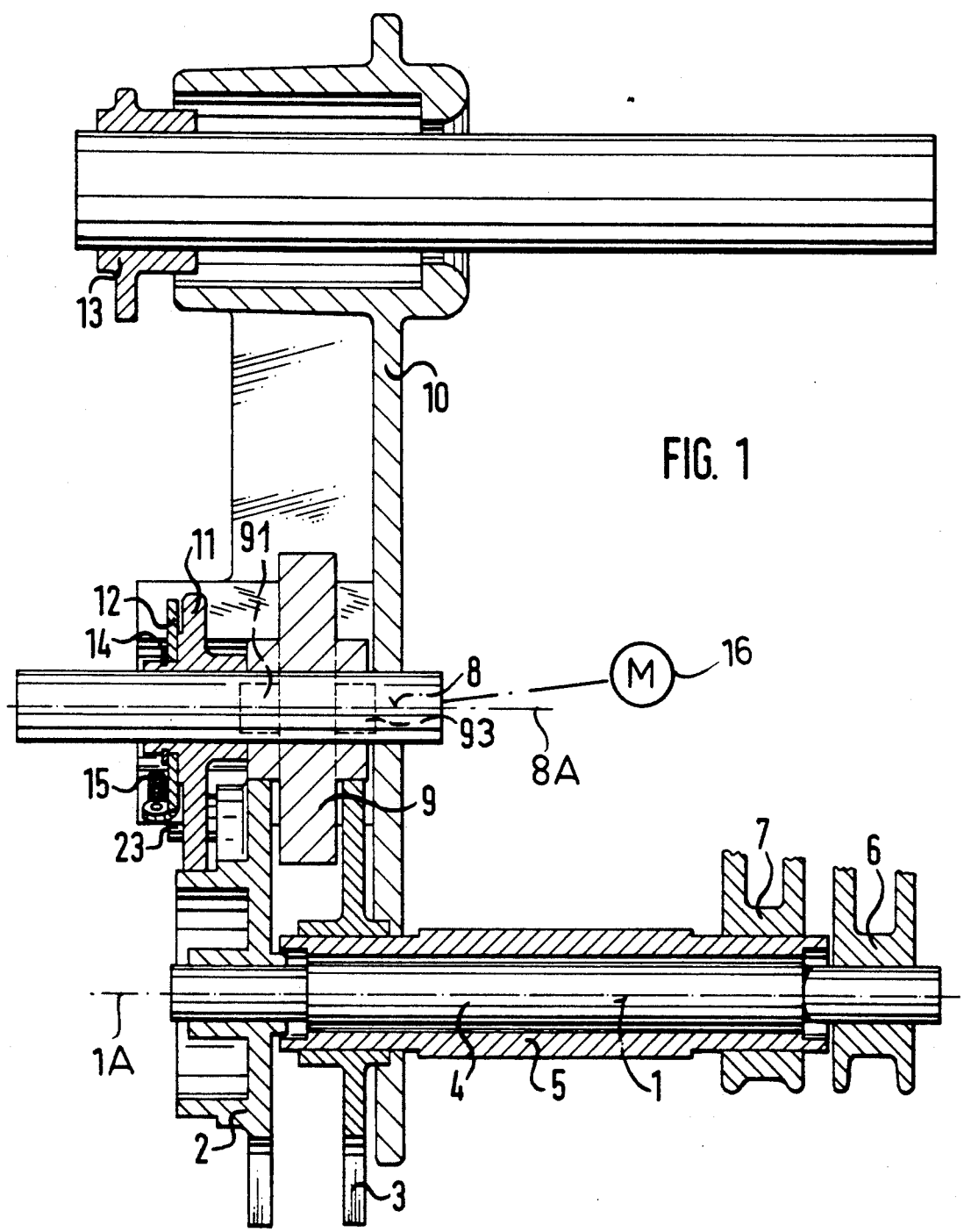
FIG. 1 is an axial section through the stepper according to this invention.

As seen in FIG. 1 a shaft assembly 1 of a stepping transformer extends along an axis 1A and has a core shaft 4 and, coaxial therewith, a tube shaft 5, both journaled in a housing 10 of the stepper. The core shaft 4 carries at its lower end a contact arm 6 and at its upper end an upper geneva wheel 2 and the tube shaft 5 carries at its lower end another contact arm 7 and at its upper end a lower geneva wheel 3 substantially identical to the wheel 2. As is standard in the art, the arms 6 and 7 carry contacts that move along circular paths spaced axially apart along the axis 1A to select different taps of a step transformer.

Figure 2A:
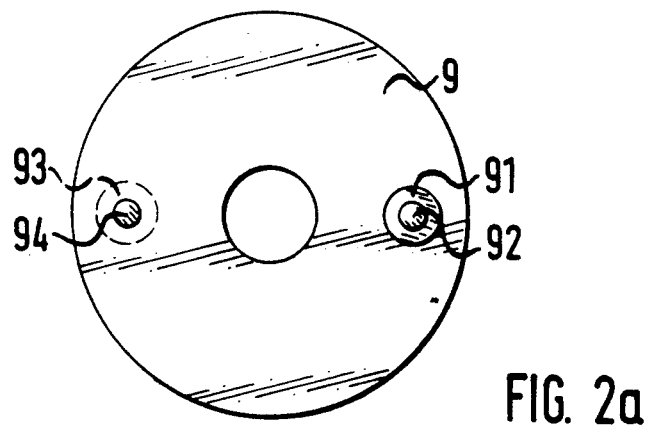
FIGS. 2a, 2b, and 2c are front elevational views of the driver, geneva wheel, and actuating lever of the stepper of FIG. 1, respectively.
Figure 2B:
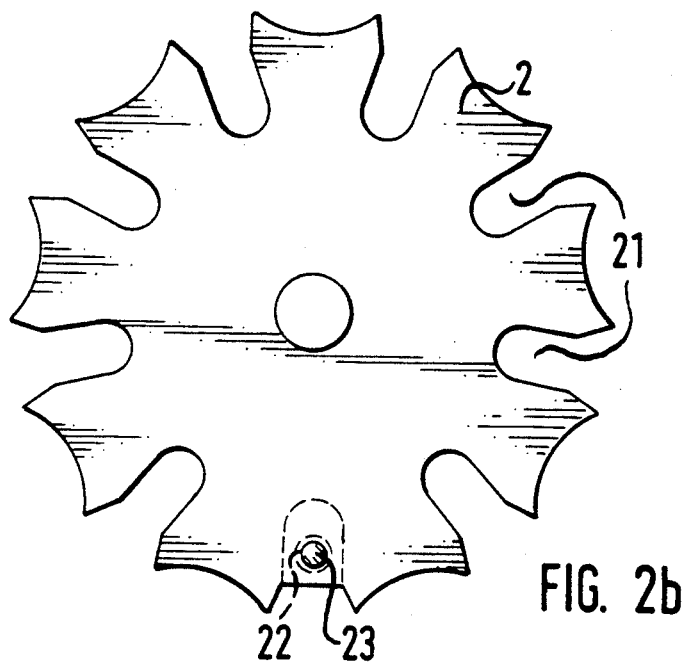

A drive shaft 8 extending along an axis 8A parallel to and offset from the axis 1A is supported on the housing 10 and carries a driver disk 9 carrying as seen in FIG. 2a on one face an abutment roller 91 by means of a bolt 92 and on its opposite face and 180° offset from the roller 91 another abutment roller 93 carried on a bolt 94. The roller 91 can engage in a manner well known in the art in radially open cutouts 21 in the wheel 2 (FIG. 2b) and the roller 93 can engage in identical such cutouts on the wheel 3. A drive motor indicated schematically at 16 can rotate this shaft 8 in either direction in angular steps of 180°. Thus with each such 180° revolution of the driver 9 one of the wheels 2 or 3 and the respective arm 6 or 7 will be indexed one angular step and the other wheel 2 or 3 and its associated structure will remain stationary.

Also carried on the housing 10 is a selector or reversing lever 13 that operates unillustrated changeover contacts and that is operated by a changeover lever 11 pivotal on the shaft 8 and in turn actuated by an abutment roller 22 carried on a pin 23 on the upper face of the upper wheel 2. This roller 22 pushes the lever 13 into end positions to prevent overtravel of the contacts carried by the arms 6 and 7 when the upper wheel 2 reaches either of two angularly offset end positions shown in FIGS. 4a and 4b. Thus the roller 22 alone serves for operating the lever 11 and this lever 11 in turn serves to arrest the wheel 2 in the end positions. Such blocking action, however, does not have angularly bidirectional effect on the driver wheel 9 and/or the lower wheel 3.

Figure 2C:
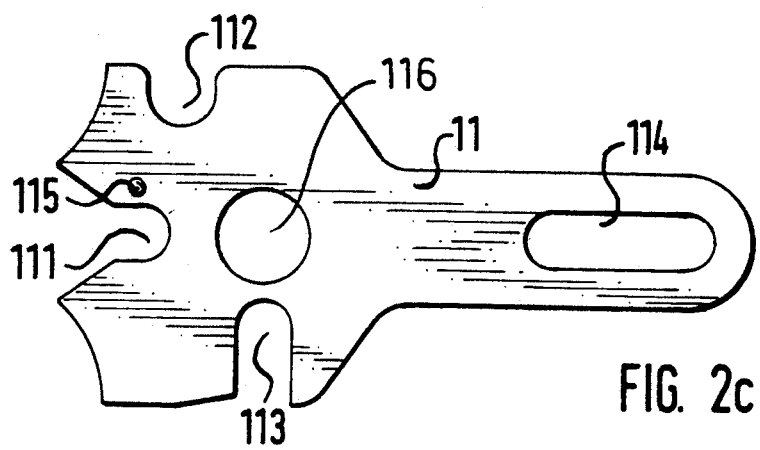

As best seen in FIG. 2c the changeover lever 11 has at its outer end a recess 111 and on its side a recess 112 shaped the same as the rollers 91 and 93. On its opposite side the lever 11 is formed with a guide slot 113 and at its upper end it has another throughgoing slot 114 that is engaged around a coupling pin 131 (FIG. 4b) on the lever 13. Centrally the lever 11 has a hole 116 by means of which it fits over the shaft 8 for rotation about the axis 8A thereof.

Figure 3:
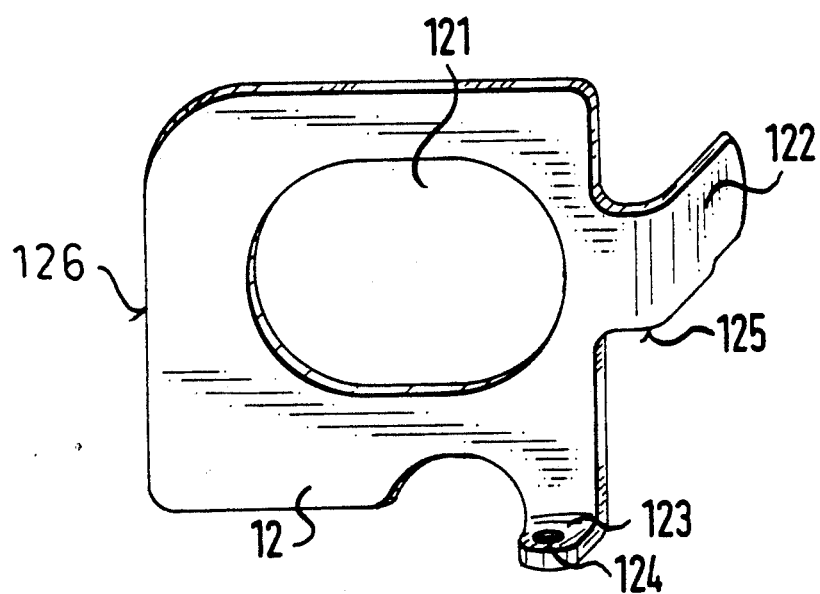
FIG. 3 is a large-scale perspective view of the end-stop element according to this invention.

A blocking plate 12 shown in FIG. 3 has a central elongated slot 121 that fits over a collar on the lever 11 and this plate 12 is held against the top face of the lever 11 by means of a snap ring 14 (FIG. 1) fitted to the collar on this lever 11. The plate 12 has a guide tab 122 that fits in the slot 113 to maintain its angular orientation while allowing it to slide radially parallel to this slot 113 and to the central elongated hole 121. A tab 123 on the plate 12 is formed with a hole 124 in which is anchored one end of a spring 15 (FIGS. 4a and 4b) whose other end is hooked over an anchor pin 115 on the lever 11. Thus the spring 15 normally pulls the plate 12 into a position with the guide tab 122 in the base of the guide notch 113.

The apparatus described above functions as follows: With each 180° rotation of the driver shaft 8 one of the arms 6 and 7 is moved a single angular step. First one of the abutments, for instance the abutment 91, engages the wheel 2, while the other abutment 93 moves in an arc out of contact with the wheel 3, and in the next half-rotation step the other abutment 93 engages in the slot of its wheel 3 while the other abutment 91 moves in an arc out of contact with its wheel 2.

When rotating clockwise as seen in FIG. 4a and reaching the end position, the abutment 22 on the pin 23 will enter the cutout 112 and will engage the rear end 126 of the plate 12 pushing it against the force of its spring 15 into its actuated position illustrated in FIG. 4a. The pin 23 will then lodge in the cutout 112, blocking further rotation of the wheel 2. This action will shift the tab 122 of the pushed-out plate 12 into the path of the abutment 92 on the wheel 9, preventing its further rotation in the clockwise direction. This action will, if necessary, also pivot the lever 11 counterclockwise into the position of FIG. 4a. As a result rotation of the wheels 2 and 9 will be absolutely blocked, completely freezing the system against further advance in the direction corresponding to clockwise rotation of the wheel 2.

FIG. 4b shows the opposite end position on counterclockwise rotation. The changeover lever 11 is in this position because the changeover abutment 23 at the appropriate time in the switching which is established by the position of the abutment 23 on the upper wheel 2 engages in the front cutout 111 of the changeover lever and moves it into this position.

In this end position an unillustrated abutment on the upper wheel 2 or even the abutment 23 itself engages against the changeover lever 11 and thus blocks the upper wheel 2 in this direction. The abutment 92 of the driver 9 is in this position engaged in a slot 21 of the wheel 2 and is locked there so that this driver 9 and the other wheel 3 are also blocked against rotation.

Thus on opposite rotation into the end position of FIG. 4b the blocking plate 12 is not effective because it is left in its unactuated position illustrated in FIG. 4b.

We claim:

1. A stepper drive for a step-type transformer, the drive comprising:

an upper geneva wheel rotatable about a wheel axis;

a lower geneva wheel spaced below the upper wheel and also rotatable about the axis;

a driver rotatable about a driver axis adjacent the wheels and having an upper abutment engageable with the upper wheel and a lower abutment engageable with the lower wheel and offset by about 180 degrees relative to the driver axis from the upper abutment the abutments traveling along respective circular paths on rotation of the driver;

a selector abutment on the upper wheel offset from the wheel axis;

a selector level pivotal about a selector axis offset from the wheel axis and engageable with the selector abutment in end positions of the upper wheel;

a blocking plate shiftable radially on the lever between an actuated position and an unactuated position;

spring means urging the blocking plate into the unactuated position;

a blocking element on the plate positioned in the path of the upper abutment of the driver in the actuated position and out of the path of the upper abutment of the driver in the unactuated position; and drive means for rotating the driver about its axis, thereby displacing the upper drive wheel between its end positions, and engaging the selector abutment in the one end position of the upper wheel against the blocking element to shift it into the actuated position on such engagement.

2. The stepper driver defined in claim 1 wherein the blocking element is a bent-over tab formed on the blocking plate.

3. The stepper drive defined in claim 2 wherein the selector lever is formed with a radial guide notch in which the tab engages and slides radially.

4. The stepper drive defined in claim 2 wherein the tab is bent perpendicular to the plate.

5. The stepper drive defined in claim 1 wherein the selector abutment is a bolt on the upper wheel and the selector lever is formed with a notch in which this bolt is engageable.

* * * * *